Nov. 25, 1969 R. A. DE PAUW ET AL 3,479,804
FEEDER HITCH
Filed Jan. 8, 1968
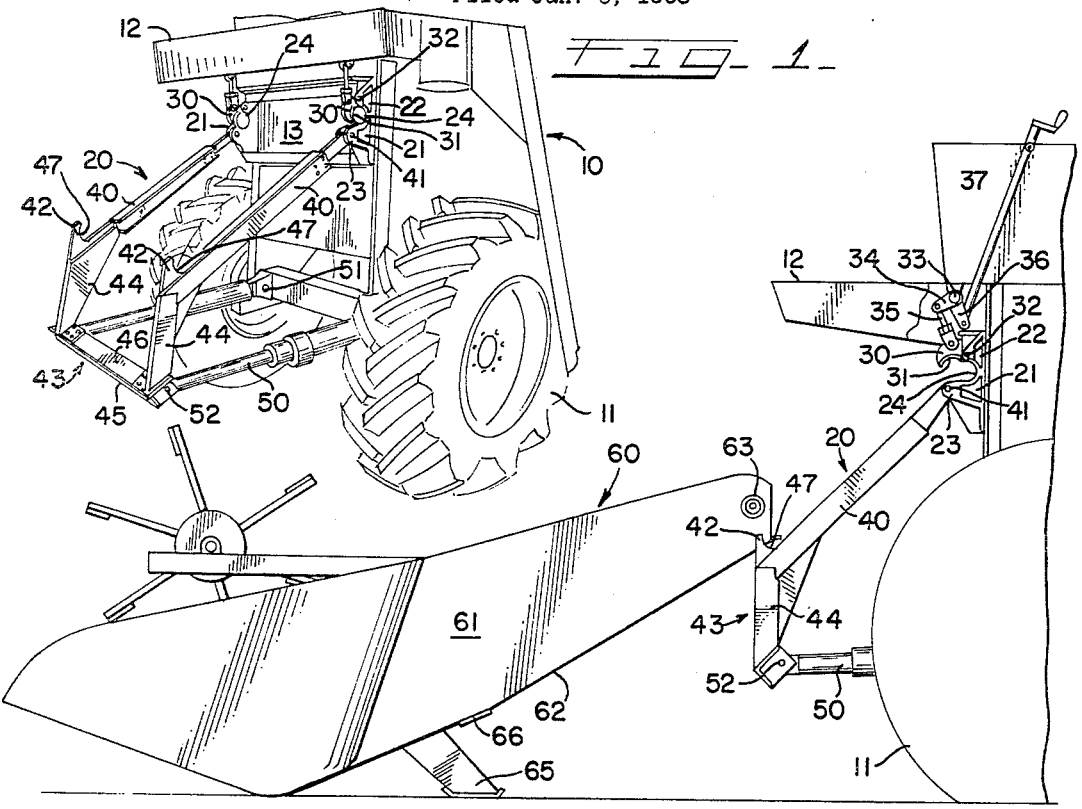
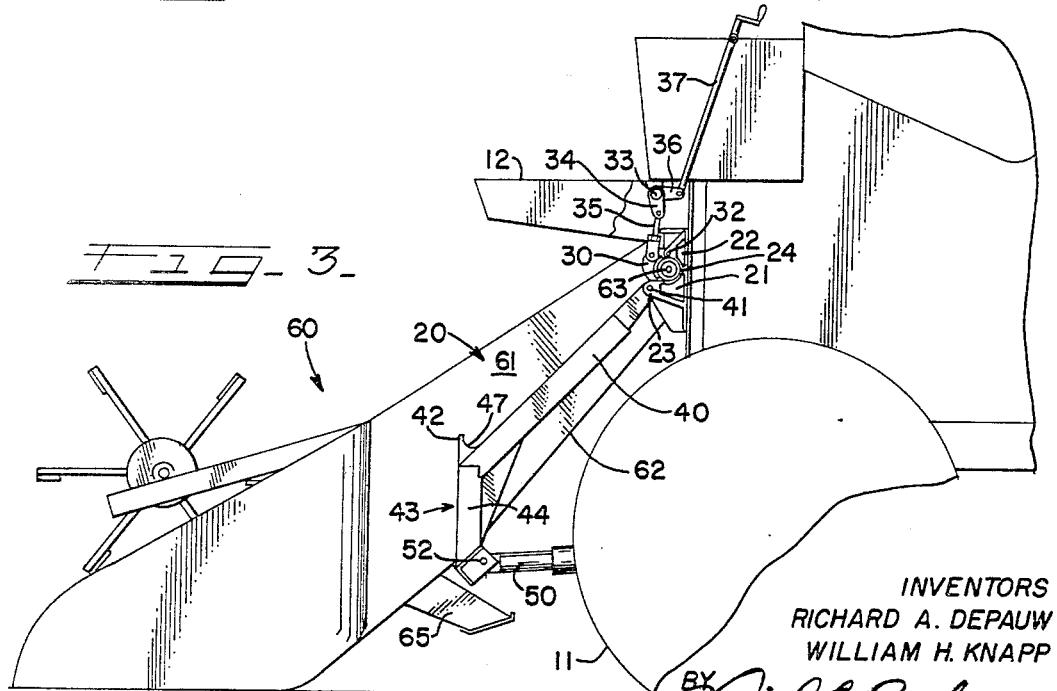
INVENTORS
RICHARD A. DEPAUW
WILLIAM H. KNAPP
BY
ATT'Y.

United States Patent Office 3,479,804
Patented Nov. 25, 1969

3,479,804
FEEDER HITCH
Richard A. De Pauw, East Moline, Ill., and William H. Knapp, Davenport, Iowa, assignors to International Harvester Company, Chicago, Ill., a corporation of Delaware
Filed Jan. 8, 1968, Ser. No. 696,278
Int. Cl. A01d *35/12*
U.S. Cl. 56—21                                   18 Claims

ABSTRACT OF THE DISCLOSURE

A header hitch for a combine comprising a U-shaped slide ramp pivotally connected to the combine at its free end and hydraulic cylinders for oscillating the slide ramp about its pivotal connection. The combine is driven forward such that the pivot shafts of the header slide up the slide ramp to their seat. Upon actuation of the hydraulic cylinders the bight portion of the U-shaped slide ramp engages the header causing it to pivot about its connection with the combine.

BACKGROUND OF THE INVENTION

The present invention relates generally to improvements in feeder hitches and the like and more particularly to a new and improved hitch and control for connecting and positioning the feeder portion of a header to the machine.

In the prior art the feeder portion of the header is pivotally connected to pivot supports adjacent the intake opening in the combine. Hydraulic cylinders are connected at one end to the combine and at the other end to the header permitting elevation of the header upon actuation of the hydraulic cylinders. Although this arrangement appears simple it is a cumbersome task to attach the header to the combine. Combines are now used in the harvest of a large variety of crops, and it is not unusual to work in two different crops in one day. This of course requires frequent changing of the header. In the prior art arrangement the hydraulic cylinders are permanently attached at one end to the combine and when the header is not connected the free ends are held off the ground by wires or the like. The hydraulic cylinders are conventionally of the one-way acting type, that is, hydraulic power is available to extend the cylinders, however, they cannot be contracted by hydraulic power. During operation the weight of the header is available to contract the cylinders and thus a double acting hydraulic cylinder is considered uneconomical. To connect the header to the combine the header is supported by parking stands or the like such that the pivot shafts of the header are on a horizontal level with the pivot supports carried by the combine. The combine is then driven forwardly into the header until the pivot shafts are seated in the pivot supports. The operator must then dismount from the combine, manually secure the pivot shafts in the pivot supports and connect the free ends of the hydraulic cylinders to the platform. The length of the hydraulic cylinders is seldom correct, because different headers require different lengths and they settle during storage. The hydraulic power can only be used to extend the hydraulic cylinders, thus this system cannot be relied upon to adjust the cylinders to the proper length. The customary practice is to actuate the valve controlling the hydraulic port from the cylinders and then manually compress the cylinder until the proper length is attained. This is a job that must be performed in a limited space and usually requires the effort of two men.

SUMMARY OF THE INVENTION

The general purpose of this invention is to provide a header hitch and adjusting mechanism which embraces all the advantages of similarly employed hitches and possesses none of the aforedescribed disadvantages. To attain this a generally U-shaped member is pivoted at its free ends to the combine below the pivot supports. The legs of the generally U-shaped member function as slide ramps to guide the pivot shafts of the platform upwardly into the pivot supports. The bight portion of the generally U-shaped member forms a cradle that engages the lower portion of the platform feeder. Hydraulic cylinders are pivotally connected to the combine and to the generally U-shaped member and upon actuation pivot the generally U-shaped member about its connection with the combine. With this invention the operator need not dismount from the platform when connecting a header to or disconnecting a header from the combine. The flexibility of the hitch frame permits pick up of the header in terrain that is less level than is possible with conventional devices.

BRIEF DESCRIPTION OF THE DRAWINGS

FIGURE 1 illustrates a front elevation of a combine having the header hitch mounted thereon;

FIGURE 2 is a side view of a combine and header aligned to be connected; and

FIGURE 3 is a side view similar to FIGURE 2 showing the header connected to the combine.

DESCRIPTION OF THE PREFERRED EMBODIMENT

Referring now to the drawings wherein like reference characters designate like or corresponding parts throughout the several views there is shown in FIGURE 1 a combine harvester generally designated 10 having drive wheels 11, an operator's platform 12 and a material intake opening 13. In FIGURE 1 a feeder hitch generally designated 20 is shown mounted on the combine.

The combine 10 has a pair of pivot supports 21 located on opposite sides of the intake opening 13. Each of the pivot supports 21 is formed with an upper lobe 22 and a lower lobe 23 which define an arcuate seat 24 therebetween. As will be further described the transversely projecting ends pivot shafts 63, of the crop gathering header 60, are adapted to be received between lobes 22 and 23 within the arcuate seat 24. Locking clamps 30 are pivotally connected to the upper lobes 22 about a pivot 32. The locking clamps have a cam surface 31 formed thereon that functions to seat the pivot shafts 63 in the arcuate seat 24.

A control mechanism is provided to permit closure of the locking clamps 30 by the operator from the operator's platform 12. A torque shaft 33 as seen in FIGURES 2 and 3 is journalled below the operator's platform and has an end portion located over each of the locking clamps 30. Lever arms 34 are secured to the torque shaft 33 and links 35 join the free ends of lever arms 34 to the locking clamps 30. Another lever arm 36 is secured to the torque shaft 33 and is connected to a control linkage 37 which will permit the operator to open and close locking clamps 30 from his platform.

The feeder hitch 20 includes a generally U-shaped member, the arms of which are formed by a pair of elongated slide ramps 40 and the bight portion by a yoke assembly means 43. The free ends of the elongated slide ramps 40 are pivotally connected to the combine by pivot pins 41 that extend through the lower lobes 23. As can be best seen in FIGURES 1 and 3 the pivotable connection between the elongated slide ramps 40 and the lower lobes 23 provide a smooth transition surface allowing the pivot shafts 63 to slide up the ramps 40 and into the arcuate seat 24. The yoke assembly means 43 is made up of a pair of vertically extending arms 44 connected by a bight portion 45. The bight portion 45 has an upwardly facing flat surface 46 (FIGURE 1) arranged at an acute angle to the horizontal. At the lower ends of the elongated slide ramps 40 adjacent the junction with the vertically extending arms 44 there are provided upwardly projecting hooks 42. The hooks 42 have arcuate surfaces 47 of a size to complement the pivot shafts 63.

A pair of hydraulic cylinder means 50 are provided for pivoting the feeder hitch 20 about the pivot pins 41. The hydraulic cylinders are pivotally connected to the combine at one end by pivots 51 and at their other end to the feeder hitch 20 by pivots 52.

The crop gathering header 60 is of conventional construction. Although a grain platform has been illustrated other headers such as a corn head could be used. The header 60 includes an upwardly extending feeder section 61 having a bottom or downwardly facing surface 62. The feeder section 61 has at its upper end a transverse pivot shaft 63 that protrudes from both sides thereof. The crop gathering header 60 has a parking stand 65 extending downwardly therefrom. As can be best seen by comparing FIGURES 2 and 3 the parking stand is raised out of engagement with the ground when the platform has been connected to the combine. A lift plate 66 is secured to the bottom surface 62 and functions as a reinforcing member.

Referring now to FIGURES 2 and 3 the operation of the device will be discussed. To connect the header 60 to the harvester combine 10 the header is supported on the terrain as depicted in FIGURE 2. The combine with the feeder hitch 20 connected thereto is aligned with the header 60 such that the headers pivot shafts 63 overlie the elongated slide ramps 40 of the feeder hitch. The locking clamps 30 are moved to the open position as shown in FIGURE 2 by manipulation of control linkage 37. The valve for cylinders 50 is closed to prevent retracting of the cylinders in response to the downward force on the slide ramps 40. With the harvester 10 and header 60 aligned as shown in FIGURE 2 the combine is driven forward towards the header causing the pivot shafts 63 to slide up the elongated slide ramps 40 over the lower lobes 23 towards the arcuate seats 24. The operator then manipulates the control linkage 37 which through lever arm 36, lever arms 34, torque shaft 33, and link 35 cause the locking clamps 30 to be pivoted downwardly such that the cam surfaces 31 engage the pivot shaft 63 firmly seating and locking them in the arcuate seat 24. In the home position this mechanism is over center locked to relieve load on the linkage. The header is thus pivotally connected to the harvester in the position as shown in FIGURE 3. To elevate the header 60 about its pivotable connection with the combine the hydraulic cylinders 50 are extended and the flat surface 46 of the yoke assembly 43 engages the lift plate 66 on the bottom surface 62 of the feeder section 61. Thus it is possible with the subject invention to connect the header to the combine such that it can be pivoted about its connection and the whole operation can be performed by the operator without leaving the operator platform. The subject invention eliminates the need to manually connect the hydraulic cylinders to the header and the requirement that the operator dismount from the operator platform to lock the pivot shafts in the home position.

The procedure required to disconnect the platform 60 from the combine is merely a reversal of the connecting procedure. The platform would be lowered to the ground to the position shown in FIGURE 3 and the operator would open the locking clamps 33 by manipulating the control linkage 37. The combine would then be backed away from the platform permitting the pivot shafts 63 to slide down the elongated slide ramp 40. When the parking stand 65 of the header engages the ground the header can then support itself and the combine can be connected to another header or corn head without further adjustment.

The purpose of the upwardly projecting hooks 42 located at the lower end of the elongated slide ramps 40 is to provide a tool for adjusting the position or location of the header. If it is desired, for example, to move the header rearwardly from a location where it is being stored, the combine would be manipulated such that the slide ramps 40 underlie the pivot shafts 63 then the hydraulic cylinders 50 would be expanded such that the pivot shafts 63 are seated in the arcuate surface 47 formed by the hooks 42 and the elongated slide ramps 40. With the pivot shafts so located the combine can then be backed away and the header will be pulled along with it. This maneuver is quite useful in locating the header on a generally level plot of ground to permit easy connection to the combine.

What is claimed is:

1. A harvester having a forward material intake opening and a crop gathering header;
   said crop gathering header having an upwardly extending feeder section, said feeder section having a bottom surface and transversely protruding pivot shafts located at its upper end;
   a feeder hitch carried by the harvester comprising,
   horizontally spaced pivot supports connected to said harvester adjacent said material intake opening and adapted to receive said pivot shafts,
   elongated slide ramps pivotally supported at one end on said harvester below each of said pivot supports,
   a yoke assembly connected to the free ends of said slide ramps and arranged to contact said bottom surface of the feeder,
   hydraulic cylinder means connected to said harvester and said feeder hitch such that upon extension of said hydraulic cylinder means the feeder hitch is pivoted upwardly about its connection to said harvester and upon engagement of said yoke assembly and said bottom surface upward pivotable movement is imparted to the crop gathering header.

2. The invention as set forth in claim 1 wherein said elongated slide ramps have upwardly projecting hooks at said free ends.

3. The invention as set forth in claim 1 where said yoke assembly includes a pair of downwardly extending arms and a connecting bight portion which is adapted to engage said bottom surface.

4. The invention as set forth in claim 3 wherein said hydraulic cylinder means is connected to said feeder hitch along the bight portion of said yoke assembly.

5. The invention as set forth in claim 2 wherein said yoke assembly includes a pair of downwardly extending arms and a connecting bight portion which is adapted to engage said bottom surface.

6. The invention as set forth in claim 5 wherein said hydraulic cylinder means is connected to said feeder hitch along the bight portion of said yoke assembly.

7. The invention as set forth in claim 1 wherein said pivot supports have cooperating locking clamps that are operable at a remote location.

8. A harvester having a forward material intake opening;
   a feeder hitch carried by said harvester comprising,
   horizontally spaced pivot supports connected to said harvester adjacent said material intake opening,
   elongated slide ramps pivotally supported at one end on said harvester below each of said pivot supports,
   a yoke assembly connected to the free ends of said slide ramps; and
   hydraulic cylinder means connected to said harvester and said feeder hitch such that upon actuation the feeder hitch is pivoted about its connection to said harvester.

9. The invention as set forth in claim 8 wherein said elongated slide ramps have upwardly projecting hooks at said free ends.

10. The invention as set forth in claim 8 wherein said yoke assembly includes a pair of downwardly extending arms and a connecting bight portion.

11. The invention as set forth in claim 10 wherein said hydraulic cylinder means is connected to said feeder hitch along the bight portion of said yoke assembly.

12. The invention as set forth in claim 9 wherein said yoke assembly includes a pair of downwardly extending arms and a connecting bight portion.

13. The invention as set forth in claim 12 wherein said hydraulic cylinder means is connected to said feeder hitch along the bight portion of said yoke assembly.

14. The invention as set forth in claim 8 wherein said pivot supports have cooperating locking clamps that are operable at a remote location.

15. A harvester having a forward material intake opening and a crop gathering header;
   said crop gathering header having an upwardly extending feeder section, said feeder section having a downwardly facing surface and transversely protruding pivot shafts located at its upper end;
   a feeder hitch carried by the harvester comprising, horizontally spaced pivot supports connected to said harvester adjacent said material intake openings and adapted to receive said pivot shafts,
   elongated slide ramps pivotally supported at one end on said harvester below each of said pivot supports,
   assembly means on the free ends of said slide ramps having upwardly facing surfaces, said assembly means arranged to contact said downwardly facing surface of the feeder;
   hydraulic cylinder means connected to said harvester and said feeder hitch such that upon extension of said hydraulic cylinder means the feeder hitch is pivoted upwardly about its connection to said harvester and upon engagement of said assembly means with said downwardly facing surface upward pivotable movement is imparted to the crop gathering header.

16. The invention as set forth in claim 15 wherein said elongated slide ramps have upwardly projecting hooks at said free ends.

17. The invention as set forth in claim 15 wherein said pivot supports have cooperating locking clamps that are operable at a remote location.

18. The invention as set forth in claim 16 wherein said pivot supports have cooperating locking clamps that are operable at a remote location.

References Cited

UNITED STATES PATENTS 2,644,284   7/1953   Oberholtz et al. _____ 56—21

FOREIGN PATENTS 1,406,278   12/1965   France.
863,978   3/1961   Great Britain.
909,443   10/1962   Great Britain.

ROBERT PESHOCK, Primary Examiner

JAMES A. OLIFF, Assistant Examiner